Oct. 22, 1946.　　　　R. G. JEWELL　　　　2,409,866
DIRECT CURRENT RATIO MEASURING ELECTRICAL INSTRUMENT
Filed June 16, 1944
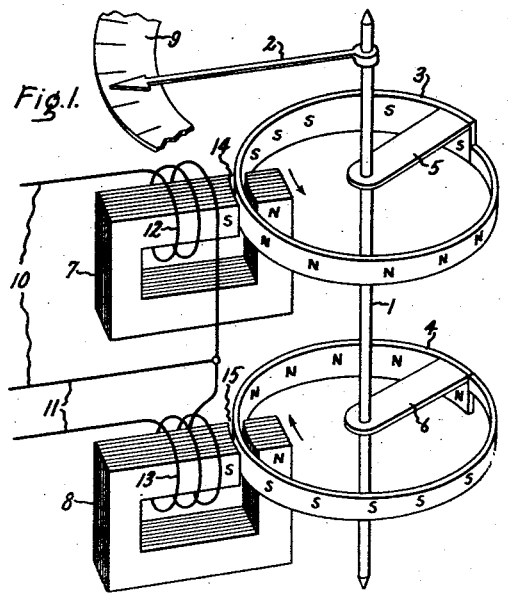
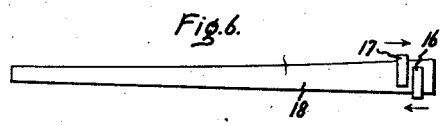
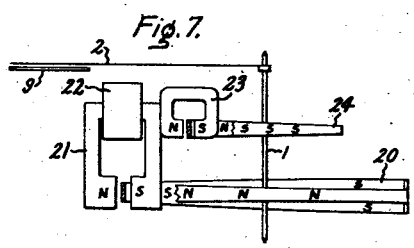
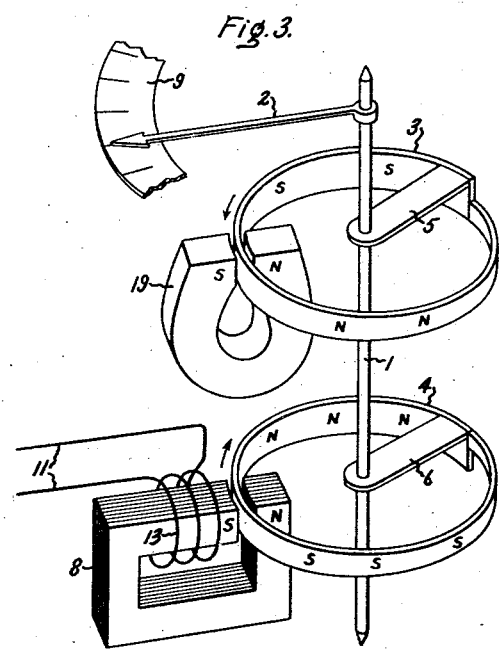
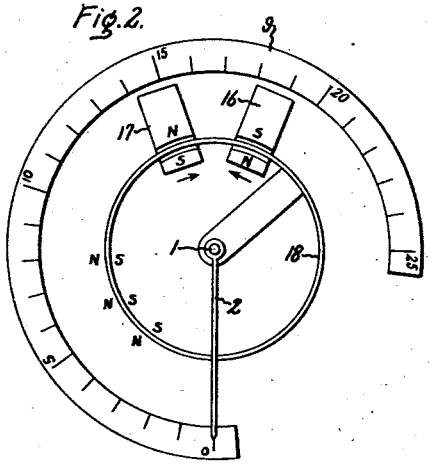
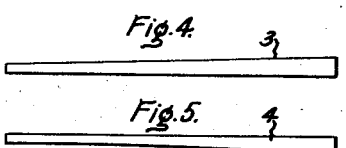
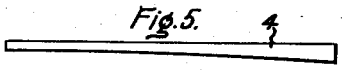
Inventor:
Richard G. Jewell,
by　Harry E. Dunham
　　His Attorney.

Patented Oct. 22, 1946

2,409,866

UNITED STATES PATENT OFFICE 2,409,866

DIRECT-CURRENT RATIO MEASURING ELECTRICAL INSTRUMENT

Richard G. Jewell, Swampscott, Mass., assignor to General Electric Company, a corporation of New York Application June 16, 1944, Serial No. 540,584

10 Claims. (Cl. 171—95)

My invention relates to direct current electrical measuring instruments and is particularly suitable for long-scale ratio instruments. In carrying my invention into effect, I employ one or more permanent magnet armature members, each in the form of a thin band or ring pivoted at its center and polarized radially. The radial thickness of such bands is preferably constant and the width or axial dimension varies to vary the polarized area and hence the total magnetic flux about the ring so as to obtain desirable angular deflection characteristics. Such ring-shaped armature member or members cooperate with stationary unidirectional field producing means having a flux air gap embracing the armature member with its flux axis radial or in the same directions as that of the armature part therein and arranged to produce repulsion or attraction torques, or both, on the armature resulting in angular deflection. Such stationary field producing means may be energized by a current to be measured or by currents whose ratios are to be determined and may include a permanent magnet for providing a zero restoring torque or the like.

The features of my invention which are believed to be novel and patentable will be pointed out in the claims appended hereto. For a better understanding of my invention, reference is made in the following description to the accompanying drawing in which Fig. 1 represents a two-armature ratio instrument embodying my invention; Fig. 2 represents a ratio instrument where two stationary field elements cooperate with the same permanent magnet armature band; Fig. 3 represents a current measuring instrument generally similar in structure to Fig. 1 except that the upper stationary magnet is a permanent magnet to provide zero restoring torque; Figs 4 and 5 represent the shapes of the straight strips which are bent into circular form to form the upper and lower armature rings of the instrument of Fig. 1; Fig. 6 represents an explanatory development of the instrument of Fig. 2; and Fig. 7 represents a zero center instrument embodying my invention.

In Fig. 1, I represents a rotary pivoted shaft carrying a pointer 2 and two circular cylindrical bands 3 and 4 supported concentric to shaft I by spider elements 5 and 6. The armature parts 3 and 4 are made of thin permanent magnetic material of a character such that it can be permanently magnetized across its thin dimension and remain permanently magnetized. As represented in Fig. 1, the band 3 is permanently magnetized in a radial direction with the inner surface of a south polarity. Band 4 is permanently magnetized in a radial direction, with its outer surface of a south polarity. One material suitable for this purpose is an alloy of from 2 per cent to 8 per cent aluminum, 5 per cent to 15 per cent manganese, and the remainder silver, such is is described in United States Letters Patent to Faus No. 2,247,804, July 1, 1941. The radial thickness of these bands may be of the order of from $\frac{1}{64}$ to $\frac{1}{16}$ inch, depending upon size of instrument, rigidity requirements, etc. They are uniformily magnetized per unit area and will vary in axial dimensions about the circle, depending upon the deflection characteristics desired. As represented in Figs. 1, 4, and 5, the upper band 3 is made of a strip with a uniform taper while band 4 is made from a strip of nonuniforms taper. The ends of the strips are preferably brought together and fastened to form the circular bands. The spider members 5 and 6 are made of non-magnetic material such as aluminum and may take any suitable form, are preferably arranged or positioned to assist in balancing the armature and pointer and so as not to interfere with the movement of the armature bands through the air gap of the stationary magnets shown at 7 and 8, over the range of armature deflection contemplated. The pointer 2 cooperates with a stationary scale 9 and it may be assumed that with the position of the armature shown in Fig. 1, the pointer is slightly above or to the right of a midscale deflection position and the scale length is of the order of 300 degrees.

The arrangement shown is for a ratio instrument where the ratio of direct currents in circuits 10 and 11 is measured, the currents flowing through the coils 12 and 13 in directions to make the poles of the stationary magnets inside the armature north poles as indicated. It will be apparent that with no current flowing in either coil the armature will tend to seek a rotary position where the core parts 7 and 8 carry a maximum flux furnished by the permanent magnet armature bands 3 and 4, or with the greatest width of the bands 3 and 4 in the radial air gaps at 14 and 15, with the spider members 5 and 6 resting against or close to the upper sides of the core parts 7 and 8. This is not important but in some cases may be utilized as a pull-off feature for example. Core parts 7 and 8 are of high permeability magnetic material such as Permalloy, numetal or nicaloi, and do not need to be laminated but may be made up of laminations for convenience in a quick selection of the desired cross section.

With current flow in the coils the torque of the top element is attractive and tends to pull the larger part of the band 3 into the air gap. This torque is essentially proportional to $KI_{10}$, where $K$ is a constant and $I_{10}$ the current flow in coil 12. The torque of the lower element is repulsive and tends to drive the band 4 to a position of least width in the air gap. This torque of the lower element is essentially $KI_{11}f(\theta)$, where $I_{11}$ is the current flow in coil 13, $\theta$ represents the angular position of the armature, and $f(\theta)$ is a function depending on the nonuniform decrease in width of band 4 as compared to the uniform decrease in width of band 3. Since the opposed torques of the two elements must be equal when the armature is at rest, $$KI_{10}=KI_{11}f(\theta) \text{ (or) } \frac{I_{10}}{I_{11}}=f(\theta)$$

and, therefore, the deflection of the armature is a measure of the current ratio $I_{10}/I_{11}$. The deflection obtained for a given current ratio can be made any value desired by shaping band 4 or, for that matter, band 3. As shown in Fig. 4, however, the sides of band 3 developed are straight and the change in band area in the gap 14 and decrease in permanent magnet flux volume therein with unit changes in angular position are uniform, and hence, the torque of this element is constant for a given current $I_{10}$ at all angular deflections, and may be increased or decreased by increasing or decreasing the uniform taper of the band 3. Band 4, developed in Fig. 5, is shaped to give greatest torque for a given value of $I_{11}$ when the largest section part is in air gap 15. As the armature rotates clockwise, the torque per unit current of the lower element decreases, and hence, a greater value of $I_{11}$ is necessary to balance the torque of the upper element. The taper of the two bands could be reversed and properly shaped to obtain similar results.

In Fig. 2 there is shown an instrument having two stationary magnets 16 and 17 acting upon the same permanent magnet band 18. One of these stationary magnets could be a permanent magnet or both could be electromagnets. They would be reversely magnetized with respect to the band 18 so as to have their torques opposed. The shaping of the band will be determined by the purpose for which the instrument is to be used and the deflection characteristics desired. A ratio instrument of this type could be built and supplementing the shaping of the band, one or both of the magnets 16 or 17 could be so positioned axially of the band as to have the band move partially in or partially out of the air gap as the armature deflects. One such arrangement is represented in developed form in Fig. 6 and may be considered as a developed representation of the instrument of Fig. 2, where only the effective air gap pole pieces of magnets 16 and 17 are indicated. Assume that in Fig. 6 magnets 16 and 17 correspond to the magnets 7 and 8 of a ratio instrument as in Fig. 1. The band 18 is uniformly tapered or straight at the bottom and non-uniformly tapered or concave at the top. Magnet 16 is positioned so that its air gap is traversed by the uniform tapered lower portion of the band 18 but not by the non-uniform tapered upper portion of the band 18. Magnet 17 is positioned so that its air gap is traversed by the non-uniform tapered upper portion of the band 18 but not by the lower uniform tapered portion. Magnet 16 is magnetized in a direction to attract the larger end of the band 18, producing substantially constant downscale torque for a given excitation, and corresponds to magnet 7 of Fig. 1 in this respect. Magnet 17 is reversely magnetized to repel the large end of the same band 18, producing a decreasing up-scale torque with deflection for a given excitation, and its action essentially corresponds to that of magnet 8 of Fig. 1. It is thus evident that the torque relations are essentially the same as explained in connection with Fig. 1. The size of the instrument is substantially decreased and the scale length is only slightly less than is possible with Fig. 1.

In Fig. 3, I have represented a direct current ammeter or voltmeter which is much like Fig. 1 in structure but has a stationary permanent magnet 19, producing constant attractive downscale torque T on the upper permanent magnet armature band 3. The lower stationary magnet 8 and its armature 4 are the same as in Fig. 1 and produce repulsive up-scale torque proportional to $KI_{11}f(\theta)$. For any given deflection, $T=KI_{11}f(\theta)$. Hence, the deflection of this instrument is proportional to the exciting current of coil 13. Here again the two magnets 19 and 8 may act on a single magnetic armature, as explained in connection with Fig. 2. Also in Fig. 3 the upper band may be shaped to produce an increasing zero return torque with deflection and the lower band shaped to produce constant torque for a given value of exciting current at all deflections. The deflection characteristics of this type of instrument can easily be altered by minor variations in the armature band width, thickness, or degree of polarization.

In Fig. 7, I have represented a long-scale, zero center, direct current measuring instrument embodying my invention. Here the lower element consists of a tapered polarized band 20 acted upon by a direct current stationary magnet 21. When there is no current in the coil 22 of this magnet, a permanent magnet 23 acting on a polarized band 24 biases the armature to the zero center or mid-deflecting position represented. This zero center return band 24 diminishes in axial width both ways from a center point which is positioned in the gap of permanent magnet 23 by attraction when there is no current flow in coil 22. The band 20 is tapered and shaped to provide diminishing torque with deflection both ways from center for a given current flow in coil 22 so that the current will need to increase to balance the zero return torque with deflections from center position. When the magnet 21 has the polarity indicated, it repels the band 20 causing the smaller section of the band to pass into the air gap of magnet 21 and when the excitation of coil 22 reverses, magnet 21 attracts band 20 and pulls the larger section into the gap of magnet 21. The deflection characteristics and relation between the zero return and deflection torques may be nicely adjusted by suitably shaping the bands 20 and 24 and proportioning their torques. It is noted that the torque arm of the zero return element is reduced as compared to that of the deflection element. This relation can be varied and reversed as requirements demand. With suitable torque deflection characteristics of the band 20 a zero center return spring could be substituted for the magnetic zero return illustrated.

It is of course evident that the types of zero return torque devices disclosed may be used on any type of indicating instrument, A.-C. or D.-C., in place of zero return springs commonly used. In special cases it may be desirable to make the circular band discontinuous. If the polarity of the permanent magnet 23 is made such as to repel the band 24, Fig. 7, the small width of the band should be in the gap thereof at the zero position to provide zero return torque.

In accordance with the provisions of the Patent Statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In an instrument, a movable armature member consisting of a circular band composed of thin permanent magnetic material not greater than $\frac{1}{16}$ inch in thickness, polarized in a radial direction through its thin dimension and mounted for rotation at its center, and stationary means positioned adjacent to said armature and with which the armature cooperates due to its polarization to influence the movement of the armature.

2. In an instrument, a movable armature member consisting of a circular band of thin permanent magnetic material of uniform radial thickness and uniformly polarized in a radial direction through its thin dimension and mounted for rotation at its center, said band varying in axial width, and stationary means positioned adjacent to said armature and within the influence of its flux to control the movement of the armature by reason of such influence.

3. In an instrument, a movable armature member consisting of a circular band of thin permanent magnetic material polarized radially through its thin dimension and pivoted for rotation about its center, said band varying in width in an axial direction, and a stationary unidirectional flux magnet having a radial flux air gap through which said band may pass when the armature is rotated.

4. In an electrical measuring instrument, an armature comprising a thin circular band of permanent magnetic material uniformly polarized in a radial direction through its thin dimension, a stationary direct current magnet having an air gap, said armature band passing through said air gap and pivoted at its center to rotate through said gap, said band varying in axial dimensions about its periphery such that when rotated the area of the band which passes through said gap varies.

5. In an electrical measuring instrument, an armature member consisting of a thin band of permanent magnetic material uniformly polarized in a radial direction through its thin dimension and mounted for rotation at its center, said band tapering in axial width about its periphery, a stationary unidirectional flux magnet having an air gap through which said band is adapted to pass when the armature is rotated whereby a magnet torque tending to rotate the armature is produced by the interaction of the magnetic forces of the magnet and band, the direction of such torque depending upon the relative polarities of the adjacent surfaces of said band and magnet.

6. An electrical ratio instrument comprising an armature having a thin circular band of permanent magnet material mounted for rotation at its center and uniformly polarized in a radial direction, a pair of stationary direct current electromagnets having air gaps through which said band passes when the armature rotates, the polarities of such electromagnets being reversed so that one produces a force of attraction on the band and the other produces a force of repulsion on the band, the axial width of said band being tapered about its periphery so that said forces produce opposed torques on said armature, said band being further so shaped that the ratio of said opposed torques for given fluxes in the electromagnets varies with the angular position of said armature.

7. An electrical ratio instrument comprising a pivoted shaft, a pair of circular bands of thin permanent magnetic material mounted concentrically on said shaft, said bands being uniformly radially polarized through their thin dimensions, a stationary direct current electromagnet having an air gap positioned so that one band may rotate therethrough, a second stationary electromagnet having an air gap positioned so that the other band may rotate therethrough said bands having axial widths which taper about the periphery such that rotary torques are produced on said bands by the interaction of their fluxes with the fluxes of the electromagnets, the relative polarities of the fluxes being such that the rotary torque produced on one band is opposed to that produced on the other, said bands being further so shaped that the relative values of said opposed torques for a given ratio of electromagnet flux varies with the angular position of the bands.

8. A direct current measuring instrument comprising an armature member having a circular band of thin permanent magnetic material mounted for rotation about its center and uniformly polarized in a radial direction, a direct current electromagnet having an air gap positioned so that the armature band passes therethrough when the armature rotates, said band having a width which tapers about the periphery of the band such that there exists a rotary torque on the band due to the interaction of its flux with that of the electromagnet when the electromagnet is energized, and means for producing an opposing rotary torque on said armature the relative values of said opposing torques varying with the flux of said electromagnet and the rotary position of said armature to cause a rotary deflection of said armature over a selected range of rotation which is proportional to the flux of said electromagnet.

9. In a measuring instrument of the deflection type, means for producing a zero return torque comprising a thin circular band of permanent magnet material mounted at its center for rotation with the deflection of the instrument, said band being uniformly polarized in a radial direction and a permanent magnet having an air gap through which said band rotates, said band having a width which tapers about the periphery thereof over that section of the band which passes through such gap corresponding to a desired deflection range of the instrument whereby a rotary torque is produced by the interaction of the fluxes of band and magnet over such range, the relative polarity of the adjacent surfaces of the permanent magnet and band being such in relation to the direction in which the band is tapered that the torque thus produced tends to return the band to a position corresponding to zero deflection.

10. A zero center direct current measuring instrument comprising a circular band of thin permanent magnet material pivoted for rotation at its center, said band being uniformly polarized in a radial direction so as to be of one polarity on the outside surface and of the opposite polarity on the inside surface, a direct current electromagnet having an air gap through which said band is adapted to rotate, said band having a varying axial width which tapers about the band over substantially its entire periphery, whereby a rotary torque is produced on the band by the flux of the electromagnet which is proportional to such flux and which reverses in direction with reversals in direction of the electromagnet flux, and zero center restoring torque means for rotatively positioning said band with the midposition of its taper in said electromagnet air gap when the electromagnet flux is zero and yieldingly to oppose the rotary movement of the band from such position in either direction when the electromagnet is energized, the relation between such opposed forces being such as to result in rotary deflections of said band from said midposition in proportion to the flux of said electromagnet and in a direction dependent upon the polarity of such flux.

RICHARD G. JEWELL.